M. & L. MANDEL.
PHOTOGRAPHIC CAMERA.
APPLICATION FILED FEB. 3, 1911.

1,088,787.

Patented Mar. 3, 1914.

M. & L. MANDEL.
PHOTOGRAPHIC CAMERA.
APPLICATION FILED FEB. 3, 1911.

1,088,787.

Patented Mar. 3, 1914.
4 SHEETS—SHEET 3.

UNITED STATES PATENT OFFICE.

MANDEL MANDEL AND LOUIS MANDEL, OF CHICAGO, ILLINOIS.

PHOTOGRAPHIC CAMERA.

1,088,787.  Specification of Letters Patent.  Patented Mar. 3, 1914.

Application filed February 3, 1911. Serial No. 606,328.

*To all whom it may concern:*

Be it known that we, MANDEL MANDEL and LOUIS MANDEL, citizens of the United States, residing at Chicago, in the county of Cook and State of Illinois, have invented certain new and useful Improvements in Photographic Cameras, of which the following is a full, clear, and exact specification.

This invention relates more particularly to magazine cameras and of this class it has more especial reference to the type in which the sensitized medium to receive the image is brought into position by the unwinding or unfolding of a strip or quantity of flexible material, though the invention is not necessarily limited to this type.

The primary object of the invention is to provide an improved magazine camera, in which separate sensitized pieces may be stored in compact form and automatically positioned one at a time back of the lens to receive the image or picture and then removed to make way for another such piece.

Another object of the invention is to provide an improved camera of this character which shall be especially adapted for taking photographs directly upon cards, such as postal cards, a large number of which may be stored in the magazine of the camera and positioned to receive the image, one at a time without affecting the remainder of the supply, thus providing an apparatus especially adapted for taking a large number of photographs out of doors where the facilities of the dark room are not available.

With a view to the attainment of these ends and the accomplishment of certain other objects, which will hereinafter appear from the accompanying drawings and following specification, the invention consists in certain features of novelty in the construction, combination and arrangement of parts which will now be fully described in detail with reference to the exemplification of the invention shown in said drawings, the invention, however, being particularly pointed out in the claims.

In the said drawings, Figure 1 is a side elevation of a camera embodying this invention. Figs. 4ª and 4ᵇ are details thereof hereinafter described.

In this exemplification of the invention the casing of the camera is designed to represent a gun or cannon but that particular form is not material. This casing is composed of three main parts, a lens holding portion 20, a magazine holding portion or body 21, and a breech cap 22 hinged or otherwise removably secured to the rear end of the magazine casing 21 to facilitate the removal of the magazine when it is desired to re-load the camera or inspect the interior.

The pieces upon which the photographs are to be taken are shown in this example of the invention as consisting of cards, for instance, postal cards 23. These pieces are of course, sensitized in any suitable way and may be utilized as either negatives or positives but when the device is used for field work where it is desired to completely finish the photograph without taking it to the dark room, these sensitized pieces may advantageously be ordinary daguerreotypes made on metal or card board or other suitable material, so that they may be developed and fixed in the field, and where such is the intention the camera may be equipped with a developing tank or apparatus 24 connected to the casing portion 21 by a chute 25 through which the sensitized pieces are allowed to drop one at a time after exposure is made. Automatic developing tanks or apparatuses of this character directly connected to magazine cameras being old in the art, the same need not be described in detail.

Figures 8, 9, 10, 11, 12, 13:
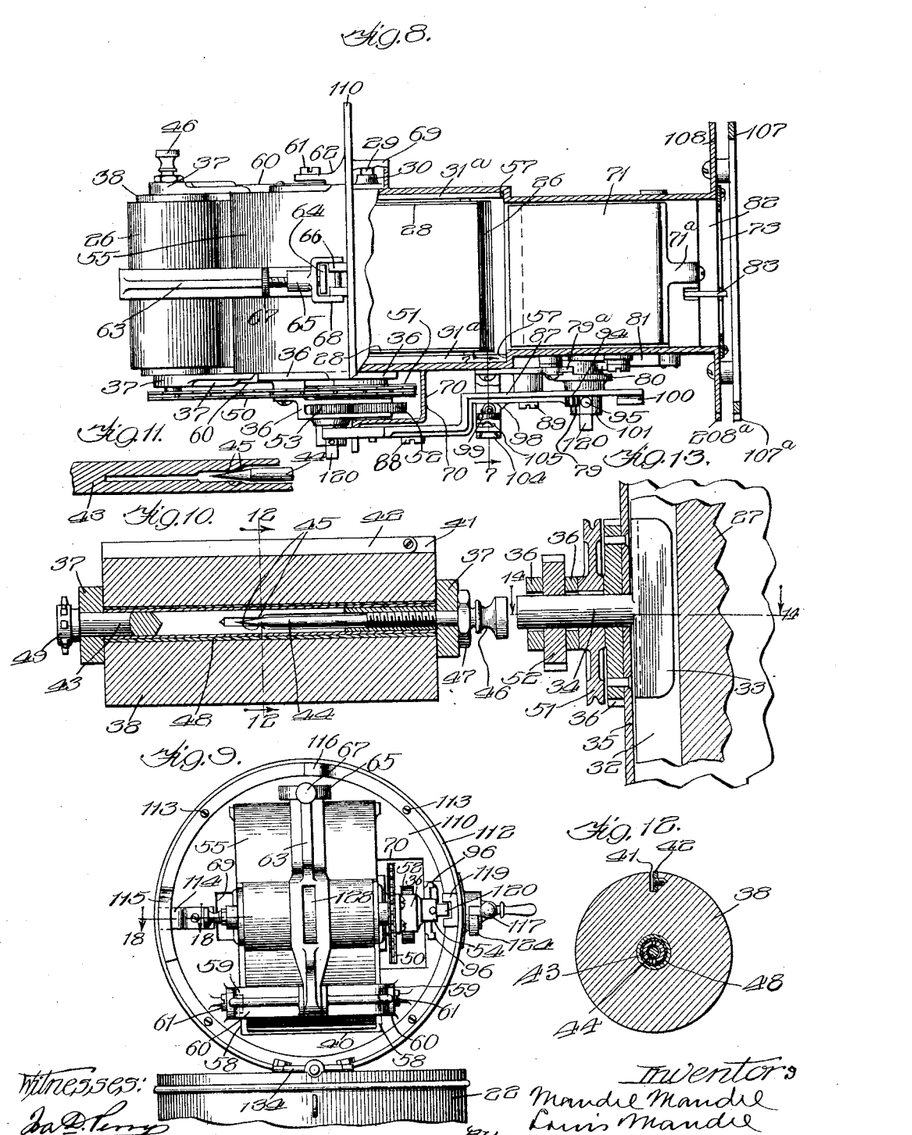
Fig. 8 is a detail view of the magazine housing in plan section, also showing its external associated parts.
Fig. 9 is a rear end elevation of the camera with the breech cap open.
Fig. 10 is a detail longitudinal section of the take-up roll hereinafter described.
Fig. 11 is a detail longitudinal sectional view of the friction clutch of such take-up roll shown on an enlarged scale.
Fig. 12 is a cross section on the line 12—12, Fig. 10.
Fig. 13 is an enlarged longitudinal sectional view of the bolt or core on which the card holding strip is wound, and a portion of the chuck mechanism for rotating the same.
Figures 14, 15, 17, 18:
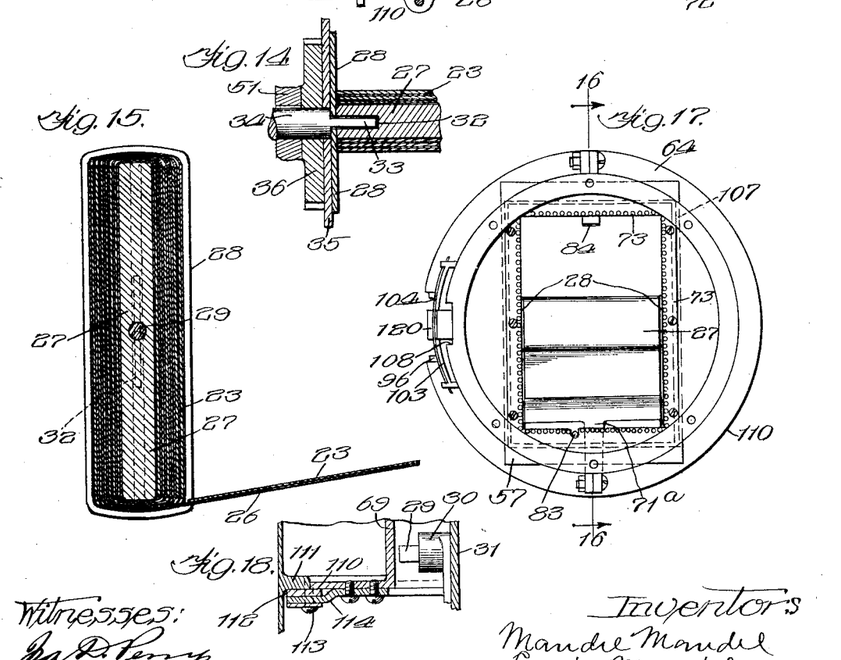
Fig. 14 is a sectional view of the same parts taken on the line 14—14, Fig. 13.
Fig. 15 is a detail sectional view of the bolt of cards or sensitized pieces, taken transversely of the axis of the bolt.
Fig. 17 is an end elevation thereof looking from the right in Fig. 16.
Fig. 18 is a detail sectional view taken on the line 18—18, Fig. 9, on an enlarged scale.
Figure 16:
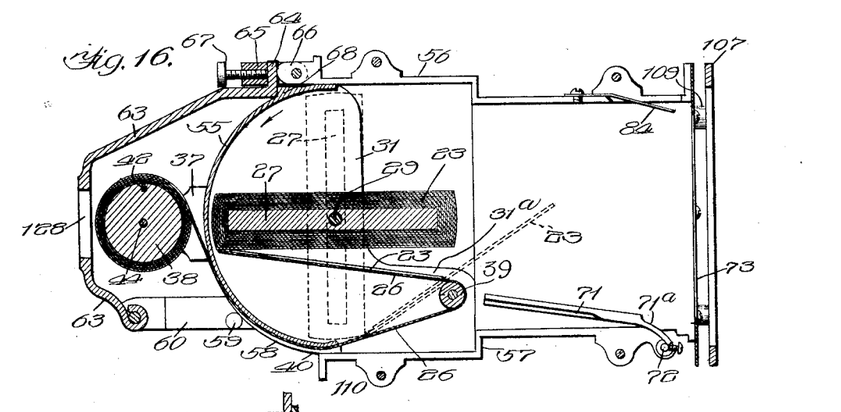
Fig. 16 is a vertical longitudinal sectional view of the magazine and housing.

The sensitized pieces 23 are stored and held between the folds of a continuous strip of paper 26 or any other suitable flexible material, which is wound upon the flat core 27 with the cards or pieces 23 lying between those folds of the strip 26 which lie parallel with the sides of the core 27, the latter being substantially the same in length as the cards. The ends of the core 27 are provided with flanges 28 which may be composed of card board, sheet metal or other suitable material secured thereto and between which flanges the strip 26 is snugly wound so that the edges of the strip bear firmly against the flanges and thus protect the edges of the cards from the light while held between folds of the strip. With the particular construction of operating mechanism shown in this example of the invention the cards may be thus arranged loosely between the folds of the strip 26 in such manner that when the package or bolt of sensitized pieces thus created is unwound, the cards will be successively uncovered and lie flat upon the upper surface of the unfolded portion of the strip, as shown in Figs. 15 and 16. The core 27 is mounted in the magazine in any suitable way so as to be capable of rotation to permit the strip to be thus unwound. To that end a pivot pin 29 is provided at one end of the core and mounted in a suitable bearing 30 in the side wall 31 of the magazine and the other end of the core is provided with a slot 32 in which is arranged a flat chuck 33 mounted on a short shaft 34 provided with means for rotating it which will be presently described, the shaft 34 being journaled in the opposite wall 35 of the magazine, and a trifurcated bracket 36 secured to such wall. As shown by the dotted lines in Fig. 15, the slot 32 extends from a point near the center or pin 29 through one edge of the core 27, so as to provide for the ready insertion of a new bolt or package of the sensitized photographic pieces. In the operation of inserting the bolt or package of sensitized pieces, the pin 29 is withdrawn longitudinally, the magazine being removed from its housing, as will be presently described, and the package is then inserted edgewise with the slot 32 engaging over the chuck 33, the ends of the chuck 33 being rounded, as shown in Fig. 13, in order to facilitate its introduction into the slot 32 past the folds of the strip 26 where the latter cross the ends of the slot. The package being introduced to a central position in the magazine, the pin 29 is then inserted longitudinally through its bearing 31 into the central passage provided for it in the core 27.

Projecting horizontally from the rear wall 55 of the magazine are two arms or brackets 37 in which is journaled a take-up roll 38, and the inner or forward edges of the side walls 31, 35 are provided with forwardly extending portions 31ª in which are journaled an idle guide roller 39. After the bolt or package of sensitized pieces has been adjusted in the magazine, the free end of the flexible strip 26 is carried forwardly over the guide roller 39, and thence under such guide roller, and outward through a passage 40, and is attached to the take-up roll 38 in any suitable way. To facilitate the attachment of the free end of the strip to this roll, the latter is provided with a longitudinal slot 41, in which is pivoted a blade 42 adapted to receive and crowd the end of the strip into the slot so that as the roll 38 is rotated, the slack of the strip will be taken up. The take-up roll is preferably rotated from the means which rotates the core 27, so that the strip will not be subjected to the undue strain which it might receive if unwound from the bolt by power applied to the strip instead of to the core, the office of the roll 38 being merely to take up the slack and keep the strip 26 reasonably taut, so that as the cards or sensitized pieces 23 are uncovered one at a time during the rotation of the bolt or package, the end of the strip where it passes around the idler 39 will afford an adequate support therefor and enable the rotating bolt to project the card forwardly beyond the roller 39. Inasmuch, however, as the diameter of the roll 38 and the strip rolled thereon will vary from time to time, according to the amount of the strip contained on the roll, it is desirable to provide the roll 38 with a driving means which will at all times impart to it a tendency to have a surface speed greater than or at least as great as the speed of the strip unrolling from the core 27, but incapable of a speed that is actually greater than the speed of the unrolling strip. To this end the roll 38 is driven by multiplying gearing in unison with the core 27, but through the intermediary of a yielding connection or friction grip. A suitable form of friction grip consists in providing the roll 38 with a split shaft 43 into one end of which is screwed an expander 44 having a conical end engaging between shoulders 45 on the shaft so that when the expander is rotated in one direction, the shaft will be expanded or its portions spread apart within the roll 38 and thereby cause the roll to rotate with the shaft with greater or less power, and when the expander is rotated in the opposite direction, this tendency of the roll to rotate in unison with the shaft will be diminished because the friction between the parts will be decreased. The outer end of the expander 44 may be provided with a thumb piece 46, and a lock nut 47 for respectively adjusting it and locking it at its adjustment.

In this example of the invention the roll 38 is shown as made of wood or other like material, and consequently the bore of the roll is provided with a bushing 48 to receive the gripping or clutching action of the shaft. The end of the shaft 43 opposite that carrying the expander 44 is provided with a sprocket wheel 49, over which passes a chain belt 50, which is driven from a larger sprocket wheel 51 keyed on shaft 34. This shaft 34 also carries a gear wheel 52 keyed thereon, and meshing with a pinion 53 of one half its diameter secured to a stud shaft 54 which is journaled between the two outer branches of the trifurcated bracket 36, the pinion 53 being of greater diameter than the sprocket 49 on shaft 43, which drives the take-up roll 38. Consequently, when the stud shaft 54 is rotated toward the right, the bolt or package of sensitized pieces 23 will be rotated counter-clockwise, or toward the left, as viewed in Fig. 16, and the chain 50 will be driven in the same direction, but at the proper speed to maintain the strip continually under tension, as before described. The back wall 55 of the magazine may be curved if desired, as shown in Fig. 16, to conform to the arc described by the ends of the rotating core 27, and to afford an appropriate surface for the strip 26 to travel against after leaving the passage 40.

The magazine 31, 35, 55, and its associated parts thus constituted, is placed within the rear end of a housing 56, as better shown in Fig. 16, with the inner ends of the projections 31ª abutting against a shoulder 57 formed in the housing to limit the inward movement of the magazine, the curved rear wall 55 of the magazine being slightly elevated at its lower end and supported in this position by side flanges 58 to constitute the slot or passage 40 for the strip 26 where it passes out of the housing 56. The magazine is thus removably held in the end of the housing by any suitable means, such as lugs 59 carried on the branches of a yoke 60 pivoted at 61 to brackets 62 secured to or formed on the rear ends of the side walls of the housing 56, said yoke being held in its locked position, shown in Figs. 5, 8, 9 and 16, by a clamp bar 63 pivoted at its lower end to the yoke 60 and provided at its upper end with a lug 64 over which is adapted to engage a clasp 65. This clasp is a U-shaped or bifurcated member pivoted to a bracket 66 carried on the top of the housing 56 at the rear end thereof in such a manner that it may be thrown down to embrace the lug 64 and thereby hold the yoke 60 in its elevated position with the lugs 59 bearing against the back of the magazine. The clasp 65 may also be provided with a clamping screw 67 whereby lost motion may be taken up, and the parts tightened, and the end of the bar 63 may be adjusted against a shoulder 68 at the top of the rear wall 55 to hold the top from tipping backwardly. When it is desired to remove the magazine for re-loading, the clasp 65 is thrown forward, thereby allowing the bar 63 and yoke 60 to drop down and permitting the entire magazine with the core of the unwound package to be removed. One of the side walls of the housing 56 is recessed in its rear edge to receive the bearing 30, in which the pin 29 is journaled (see Fig. 8), and the outer wall 69 of this recess serves to hold the pin 29 in place when the magazine is positioned for use. The opposite wall of the housing 56 is similarly recessed, as indicated at 70, to receive the sprocket 51 and gear wheel 52.

When the core 27 is given substantially a one-quarter rotation toward the left, as viewed in Fig. 16, starting from about the position shown in full lines in said figure, one of the covered cards of the package will be first brought into the position shown in dotted lines in said figure, and then by a further quarter turn will be projected forwardly onto a card holding plate 71 arranged in the forward end of the housing 56 and preferably in a slightly inclined position, so that the card will have a tendency to slide away from the strip 26. This plate 71 is secured to a transverse shaft 72 journaled in the bottom of the housing 56, and so arranged that when it is rotated toward the right, the card holder plate 71 will be brought into upright position, see Fig. 16, holding the card in position against a plate 73 having an aperture formed therein, as shown in Fig. 17, of any desired design, through which the card is exposed to the rays of light coming from the lens 20ª mounted as usual in the lens portion 20 of the camera casing. In this example of the invention, the plate 73 is provided with a rectangular opening nearly the full inside dimensions of the end of the housing 56, and consequently, said plate 73 is merely an annulus or ring surrounding the end of the housing. The outer end of the shaft 72 is provided with a crank arm 74, which is connected by a link 75 to the lower end of an arm 76, whose upper end is pivoted at 77 on the outside of the housing 56, and is arranged to be engaged by a cam 78 secured to the inner end of a stud shaft 79, the arm 76 having a projection 80 to better facilitate the action of the cam against it.

When the shaft 79 is rotated a half turn toward the right, it forces the arm 76 in that direction against the action of a spring 81, thereby standing the card holder 71 in its upright position with the card clamped between it and the plate 73 ready for exposure, and when the shaft 79 is given a further turn or half turn in the same direction, the spring 81 will return the arm 76 to its former position and thereby return the card holder 71 to its initial position, shown in full lines in Fig. 16. When the card holder 71 thus returns to its initial position, the card drops endwise or edgewise automatically from the housing 56 through a slot 82 extending across the end of the housing 56. This slot is positioned over the chute 25 secured to the under side of the camera casing portion 21, through which the card drops into the developing tank 24, as before described.

Figure 6:
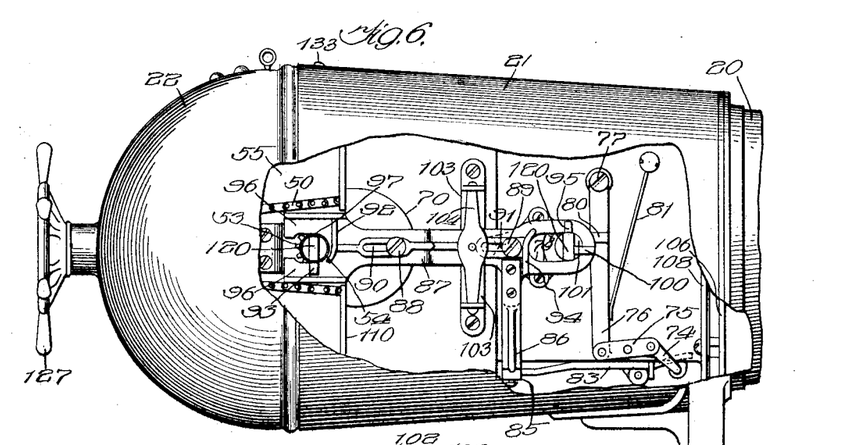
Fig. 6 is a view showing said parts in the position they assume when the card holder is advanced for holding a card in position.

When the card is being placed in position by the holder 71, it is held against undue lateral motion by the side walls of the housing 56 and it is prevented from sliding downwardly through the slot 82 by an automatic support 83 arranged to be projected across the slot 82 before the plate or holder 71 starts to rise, and to be withdrawn before or at or about the time the holder 71 starts to return to its initial position. In order that the card may not follow the holder 71 backwardly into the housing and fail to fall through the slot, a spring check 84 is positioned at the top of the housing in such a way as to be engaged and deflected by the card when ascending, thus permitting the card to pass, but to hold the card against a return movement. The plate 71 is not of sufficient height to engage the spring check 84. In order that the card support 83 may be thus automatically actuated, it is projected through the bottom of the housing 56 and secured at its rear end to a laterally extending projection 85 carried on the lower end of an arm 86, which is secured to a sliding bar 87 adapted to be operated in harmony with the core 27 and card holder 71 by any suitable mechanism, such as will now be described. The bar 87 is slidably mounted on the side of the housing 56 by means of studs or screws 88, 89, passing through slots 90, 91 in the bar. One end of the bar is provided with a cam 92 arranged to be engaged by a pin 93 projecting laterally from the stud shaft 54, when said shaft is rotated its second half turn toward the right, starting with the parts in the position shown in Fig. 6, the pin 93 being turned downward. This imparts a longitudinal movement to the bar 87 toward the right and carries the card support 83 across the card slot 82 preparatory to receiving the card. The throw of the bar 87 toward the right brings another cam 94 on the opposite end thereof into position to be engaged by a pin 95 projecting from stud shaft 79 when the second half turn is imparted to this shaft for the purpose of returning the card holder to its initial or substantially horizontal position, and thereby pushing the bar 87 back again or toward the left and carrying the card support 83 out of its position across the slot 82. Stud shaft 79 is mounted in a suitable bearing piece 79ª behind bar 87 and projects through slot 79ᵇ in the latter.

Figures 1, 4A, 4B:
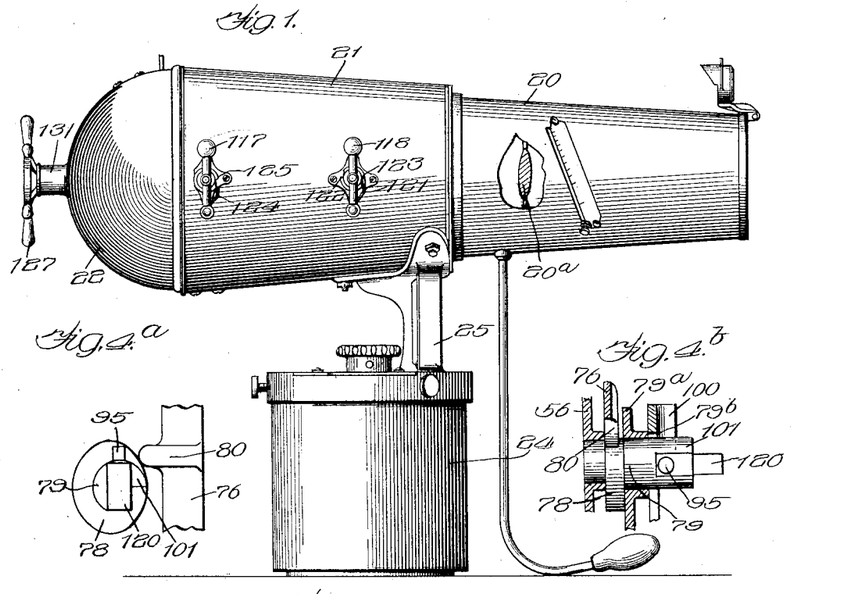
Figures 2, 3, 4:
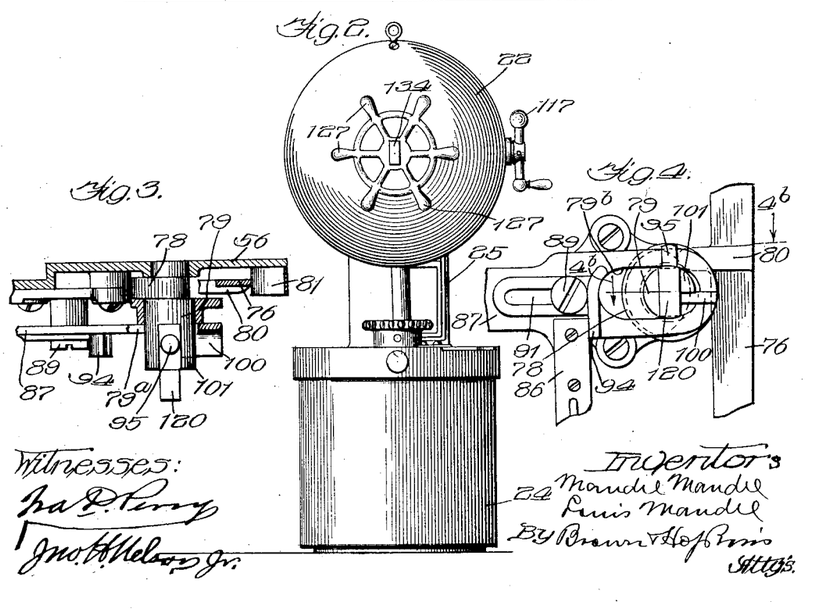
Fig. 2 is a rear elevation thereof.
Fig. 3 is a detail side elevation of a lock hereinafter described.
Fig. 4 is a plan view thereof.

In the operation of the machine, the shaft 54 is rotated a full turn first, for placing the card upon the card holder 71, the shaft 79 being then rotated as before described, first a half turn for positioning the card against the plate 73, preparatory to making the exposure, and then another half turn for dropping the card and returning the holder 71 to initial position. It is desirable, therefore, that the shafts 54, 79 be locked against rotation at times when it would be improper, owing to a certain position of the other parts, to rotate them. To that end, the bar 87 is constituted a locking bar. One end of it is provided with bifurcations or jaws 96 arranged to fit accurately over flattened faces 97 on the stud shaft 54 when the locking bar 87 is given its full throw toward the right and the stud shaft 54 has been given its second half turn, from the position shown in Fig. 6. The pin 93 is of course incapable of moving the locking bar 87 to the full limit of its throw, and consequently, an independent means is provided for continuing the movement of the bar after the stud shaft 54 has made a complete turn. The expedient shown in the drawing for this purpose is a double incline 98 formed on the face of the bar 87, and arranged to engage a spring-pressed roller 99 in such a way that when the pin 93 moves the bar 92 as far as it can, the apex of the incline 98 will be carried beyond the center of the roller 99 whereby the pressure of the roller on the incline will shoot the bar to the limit of its throw and bring the jaws 96 into engagement with the flattened faces 97 of the shaft 54. When the locking bar is thus positioned, the shaft 79 is free to rotate, but until the bar is so positioned, the shaft 79 is locked against rotation by a shoulder 100 carried on the face of the bar in position to be engaged by a tooth 101 carried by shaft 79, thus holding the pin 95 in its upright position, as shown in Fig. 4.

Figure 5:
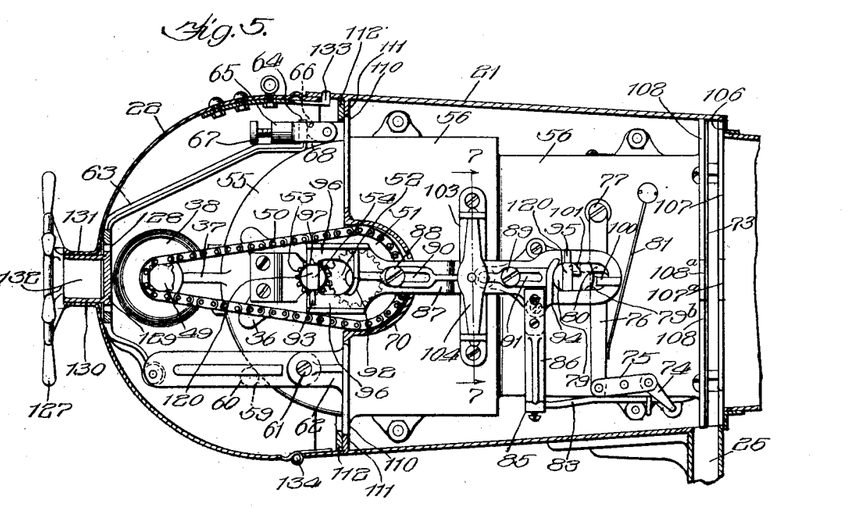
Fig. 5 is an enlarged vertical longitudinal section of the rear end of the camera showing the magazine and its associated parts in elevation, the parts being in the position they assume when the card holder is retracted.
Figure 7:
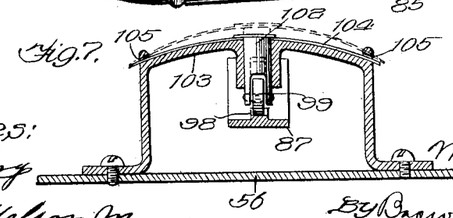
Fig. 7 is an enlarged detail section taken on the line 7—7, Fig. 5.

In Fig. 5 the shaft 79 is unlocked and free to rotate. The first half rotation does not disturb the position of the locking bar, but the second half rotation causes the pin 95 to engage cam 94 and force the locking bar toward the left, carrying the apex of the double incline 98 beyond the center of roller 99, which acts to shoot the bar its full throw to the left as before described, with reference to the right hand throw, thereby returning the shoulder 100 to a position under the tooth 101 and locking the card holder 71 against operation while unlocking the package rotating mechanism. The roller 99 is shown as mounted in a slide 102 arranged in a bridge 103 (see Fig. 7). The outer end of the slide projects through the bridge and engages a leaf spring 104, whose ends are retained in slots 105, for holding the spring in place and permitting of its elastic action against the slide 102.

The shape of the card 23 in this example of the invention is rectangular, and consequently it is desirable to have the construction such that the card may be held in positions with its longer axis both horizontal and vertical at the pleasure of the operator. To that end it is desirable that the entire magazine housing be rotatably mounted within the camera casing 20, 21. The portion 21 at least of the camera casing is therefore desirably made cylindrical, and is formed with an internal shoulder at 106 against which presses a suitable bearing on the inner end of the magazine housing. This bearing is constituted by a ring 107 secured to a circular flange 108 surrounding the inner end of the housing by means of short studs 109, which hold the bearing ring 107 away from the plate 73, permitting the latter to be removed when desired and replaced by other plates having openings of different designs. This bearing ring 107 abuts squarely against the shoulder 106, and fits accurately within the camera body portion 21, so as to hold the magazine housing against end thrust and also central. The rear end of the magazine housing is provided with a surrounding flange 110, which affords means of supporting the rear end centrally while being rotated in the camera casing. When the magazine housing is in position, the flange 110 fits within an internal flange 111 formed in or secured to the casing portion 21, and the magazine housing is held against accidental rearward movement by means of ring 112, which is secured by screws 113 or other means to the flange 111, and overlaps the flange 110. When the magazine housing is in one position, with the card vertical for example, a stop 114 secured to the back of flange 110 (see Fig. 9) engages with the clip 115 formed on ring 112, and when the magazine housing is given a quarter turn for positioning the card horizontally, this stop 114 engages a similar clip 116 on ring 112, thus relieving the operator of the necessity for exercising any skill or care in changing the magazine housing from one position to the other.

The shafts 79, 54, are rotated from the exterior of the camera casing by means of keys or handles 117, 118 respectively. These are journaled in the side of the camera casing section 21 in any suitable way, and each is provided with a bifurcated inner end forming jaws 119 adapted to engage with flattened projections 120 on the shafts 79, 54, respectively so that the magazine housing may be readily rotated, as before described, when the jaws are arranged vertically to permit the flat projections 120 to pass from between them. The stem of the knob 118 is provided with a click spring 121, and the side of the bearing of the stem with two notches 122, 123, arranged at 180° apart so that the half turns of the knob will be manifested to the operator. The stem of the knob 117 is provided with a similar click spring 124, but its bearing has but a single notch 125 to indicate when the knob 117 has been rotated sufficiently to unreel strip 26 and project one of the sensitized pieces 23 therefrom on to the card holder 71.

The rotation of the magazine housing is accomplished from the exterior of the camera casing without necessarily opening the latter. After one of the photographic pieces or cards 23 is clamped in position against the flange or plate 73 by the card holder 71, as before described, and it is desired to change the position of the same from vertical to horizontal, or vice versa, the entire magazine housing, together with the magazine and connected parts, is rotated on the longitudinal axis of the camera until the stop 114 engages with one or the other of the clips 115, 116. For this purpose the camera casing is provided with a knob 127 journaled therein on the longitudinal axis of the magazine housing and provided with means of engagement with the bar 63, which extends between the take-up roll 38 and the breech cap 22, so that when the knob is rotated, the bar 63 and connected parts will effect the rotation of the magazine housing. Any simple expedient may be employed for thus connecting the hub 127 and bar 63. In the example shown, the bar is provided with a slot or socket 128 (see Fig. 5) and the knob with a rectangular or non-circular key 129 secured for rotation therewith. The key is shown as being formed on the inner end of a bushing 130, which is journaled in a neck 131 on the casing cap and secured in any suitable way to a stem 132 of the knob 127. When the cap 22 is opened, which may be done by depressing a latch 133 and throwing the cap backward on its hinge 134, the key 129 will recede from its socket 128, and when the cap is closed, it will again enter its socket. The position of the magazine housing may be indicated on the exterior by a suitable index, such as an oblong figure 134, provided on the outer face of the knob 127, and corresponding in position to the position of the card.

In order that the invention may be understood by those skilled in the art, the details of an example thereof have been thus specifically described, but

What we claim as new therein and desire to secure by Letters Patent is:

1. In a camera the combination of flexible material lapped upon itself for holding a plurality of separate sensitized pieces between the laps thereof in non-curled condition, a lens, means for unfolding said flexible material, and a single means for consecutively receiving and exposing said pieces one at a time to the lens.

2. In a camera, the combination of a strip of flexible material flatly lapped upon itself for flatly holding a plurality of separate sensitized pieces between the laps thereof, a lens, and means for exposing said pieces one at a time to said lens, comprising means for unfolding said strip and a movable holder to receive and discharge said pieces.

3. In a camera, the combination of flexible material lapped upon itself in substantially flat folds for holding a plurality of separate sensitized pieces between said folds in non-curled condition, a lens, and mechanism for receiving said pieces one at a time and carrying them into position relatively to said lens.

4. In a camera the combination of flexible material lapped upon itself for holding a plurality of separate sensitized pieces between the folds thereof, a lens, and means for exposing said pieces one at a time to said lens, comprising means for unfolding said flexible material for a portion of its length equal to the length of one fold at a time, and a movable holder for automatically receiving and discharging the exposed pieces.

5. In a camera, the combination of flexible material lapped upon itself for holding a plurality of separate sensitized pieces between the folds thereof, a lens, means for unfolding said flexible material to successively deliver said pieces, a carrier adapted to receive and positively present them in a position exposed to said lens, a casing, and means outside the casing for actuating said unfolding means.

6. In a camera, the combination of flexible material lapped upon itself for holding a plurality of separate sensitized pieces between the folds thereof, a lens, and means for exposing said pieces one at a time to said lens comprising means for unfolding said flexible material, and means for receiving the pieces substantially horizontally one at a time from said folds and bodily carrying and presenting the same to the lens.

7. In a camera, the combination of flexible material lapped upon itself for holding a plurality of separate sensitized pieces between the folds thereof, a lens, means for exposing said pieces one at a time to said lens comprising means for unfolding said flexible material, and means for receiving the said pieces and presenting the same to the lens, and inter-locking means for locking one of the last said means when the other one is actuated.

8. In a camera the combination of flexible material lapped upon itself for holding a plurality of separate sensitized pieces between the folds thereof, a lens, means for exposing said pieces one at a time to the said lens comprising an unfolding means for said flexible material and a means for receiving the pieces from the flexible material and presenting the same to the lens, separate shafts for operating the last two said means respectively, and a locking bar movable by one of said shafts for locking the other against rotation.

9. In a camera, the combination of a rotary flat-sided bolt or package of flexible material wound about an axis extending lengthwise of its axis of rotation, for holding a plurality of sensitized pieces between the laps or folds thereof, a lens, and means for delivering said pieces one at a time in one plane, comprising means for rotating said bolt to unwind said flexible material, and a positioner for presenting them to said lens in a different plane.

10. In a camera, the combination of a rotary flat-sided bolt of flexible material wound about an axis extending lengthwise of its axis of rotation, for holding a plurality of sensitized pieces between the laps or folds thereof, a lens, means for exposing said pieces one at a time to the lens comprising means for rotating said bolt to unwind said flexible material, means for taking up the unwound material, and compensating mechanism interconnecting said bolt and take up means.

11. In a camera, the combination of a rotary flat-sided bolt or package of flexible material wound about an axis extending lengthwise of its axis of rotation, for holding a plurality of sensitized pieces between the laps or folds thereof, a lens, means for exposing said pieces one at a time to the lens comprising means for rotating said bolt to unwind said flexible material, a take-up roll for the unwound material, and means for imparting to said take-up roll a tendency to rotate at a greater surface speed than the speed of travel of the unwinding flexible material.

12. In a camera, the combination of a rotary flat-sided bolt or package of flexible material wound about an axis extending lengthwise of its axis of rotation, for holding a plurality of sensitized pieces between the laps or folds thereof, a lens, means for exposing said pieces one at a time to the lens comprising means for rotating said bolt or package to unwind said flexible material, and means for keeping the flexible material under tension.

13. In a camera, the combination of a rotary flat-sided bolt of flexible material wound about an axis extending lengthwise of its axis of rotation, for holding a plurality of sensitized pieces between the laps or folds thereof, a lens, and means for exposing said pieces one at a time to the lens comprising means for rotating said bolt to unwind said flexible material, and means for extending a portion of the unwound material toward the lens for causing the sensitized pieces to be projected away from the bolt.

14. In a camera, the combination of a rotary flat-sided bolt or package of flexible material wound about an axis extending lengthwise of its axis of rotation, for holding a plurality of sensitized pieces between the laps or folds thereof, a lens, means for exposing said pieces one at a time to the lens, comprising means for rotating said bolt to unwind said flexible material, a guide roller removed from the axis of rotation of the bolt and around which the flexible material passes for conducting the pieces toward the lens, and means for keeping the flexible material under tension.

15. In a camera, the combination of a rotary flat-sided bolt of flexible material wound about an axis extending lengthwise of its axis of rotation, for holding a plurality of sensitized cards between its folds, a lens, and means for exposing said cards one at a time to the lens comprising means for rotating said bolt to unwind said flexible material, and a card holder movable from a position to receive a card from the bolt to a position transverse to the axis of the lens.

16. In a camera, the combination of a rotary flat-sided bolt of flexible material wound about an axis extending lengthwise of its axis of rotation for holding a plurality of sensitized cards between its folds, a lens, and means for exposing said cards one at a time to the lens comprising means for rotating said bolt to unwind said flexible material, and an oscillatory card holder movable from a position to receive the cards from said bolt to a position transverse to the axis of the lens.

17. In a camera, the combination of a rotary flat-sided core, a strip of flexible material wound upon said core for holding a plurality of sensitized pieces between the laps thereof lengthwise of the flat sides of the core, a lens, and means for exposing the said pieces to the lens, comprising a means for rotating said core to unwind said flexible material, and an automatic take-up for said flexible material.

18. In a camera, the combination of a rotary flat-sided core having flanges at the ends thereof arranged transversely to its axis of rotation, a strip of flexible material wound thereon between said flanges for holding a plurality of sensitized pieces between the folds thereof, a lens, and means for exposing said pieces one at a time to the lens comprising means for rotating said core and unwinding said strip, and a rotatable holder for receiving said pieces when the flexible strip is unwound and for discharging them when exposed.

19. In a camera, the combination of a magazine package comprising a continuous strip of flexible material lapped upon itself for holding a plurality of sensitized pieces, a lens, a plate having an exposure aperture situated back of the lens, and a device for transferring said sensitized pieces from said package to said aperture, comprising means for unfolding said flexible material, and a rotatable holder for receiving said sensitized pieces when the flexible means is unfolded and for positioning them over the aperture.

20. In a camera, the combination of a package of flexible material lapped upon itself for holding a plurality of sensitized pieces, a lens, a plate having an exposure aperture situated back of the lens, a housing inclosing said package and plate, and means for placing said pieces over the aperture of said plate, comprising means for unfolding said flexible material, said housing having a slot adjacent said plate at the side thereof removed from the lens, for the passage of said pieces after exposure.

21. In a camera, the combination of a package of flexible material lapped upon itself for holding a plurality of sensitized pieces, a lens, a plate situated back of the lens, and having an exposure aperture, means for placing said pieces over said exposure aperture comprising means for unfolding said flexible material, a housing inclosing said package, plate and lens and having a bottom slot adjacent said plate for the sensitized pieces to drop through after exposure, a support for the pieces extending across said slot, and means operatively related to the said means for placing the pieces over the exposure aperture for projecting and retracting said support.

22. In a camera, the combination of a package of flexible material lapped upon itself for holding a plurality of sensitized pieces, a lens, means for exposing said pieces to the lens comprising means for unfolding said flexible material and thereby releasing the pieces from the folds thereof, an inclined holder for receiving said pieces from the folds of said flexible material and holding the same in position while exposed to the lens, and means for moving said inclined holder from its receiving position to the exposure position.

23. In a camera, the combination of a package of flexible material lapped upon itself for holding a plurality of sensitized pieces between the folds thereof, a lens, a plate having an aperture situated back of the lens, means for placing the said pieces against said plate over said aperture comprising means for unfolding said flexible material to project the pieces therefrom, and means for receiving the pieces from the folds of said material and conveying the same to a position against said plate, a housing for said package and plate having a slot for the exit of the pieces after they are exposed, and a yielding stop arranged adjacent the back of said plate for engaging the upper portion of said pieces and preventing the same from moving backwardly after exposure.

24. In a camera, the combination of a package of flexible material lapped upon itself for holding a plurality of sensitized pieces, a lens, and means for exposing said pieces to the lens comprising means for unfolding said flexible material, means for receiving the pieces from the folds of said material and presenting the same to the lens, shafts for operating the last two said means respectively, a camera casing, and knobs journaled in said casing and having operative controlling relation to said shafts for rotating the same.

25. In a camera, the combination of means for holding a plurality of sensitized pieces comprising a rotatable housing, a camera casing in which said housing is rotatable, a knob journaled in the casing, a lens situated within the casing, means for presenting said sensitized pieces to the lens for exposure, means detachably connecting the last said means with said knob, and means for rotating the said housing.

26. In a camera, the combination of a package of flexible material lapped upon itself for holding a plurality of sensitized pieces, a lens, means for exposing said pieces to the lens, comprising means for unfolding said flexible material, a housing containing said package and means, a camera casing in which said housing is rotatable, stops for limiting the degree of rotation of said housing, and means for rotating said housing from the exterior of the casing.

27. In a camera, the combination of a magazine housing, a magazine removably inserted therein, means for locking said magazine in place in the housing, a package of flexible material lapped upon itself for holding a plurality of sensitized pieces, situated in said magazine, a lens, and means for exposing said pieces to the lens comprising a means for unfolding said flexible material.

In testimony whereof we have signed our names to this specification, in the presence of two subscribing witnesses, on this 17th day of January, A. D. 1911.

MANDEL MANDEL.
LOUIS MANDEL.

Witnesses:
K. W. WORMELL,
NINA J. HALSNE.

Copies of this patent may be obtained for five cents each, by addressing the "Commissioner of Patents, Washington, D. C."